July 22, 1941.  J. L. FITZURKA  2,249,729
AIRPLANE WING
Filed Sept. 18, 1939   3 Sheets-Sheet 1
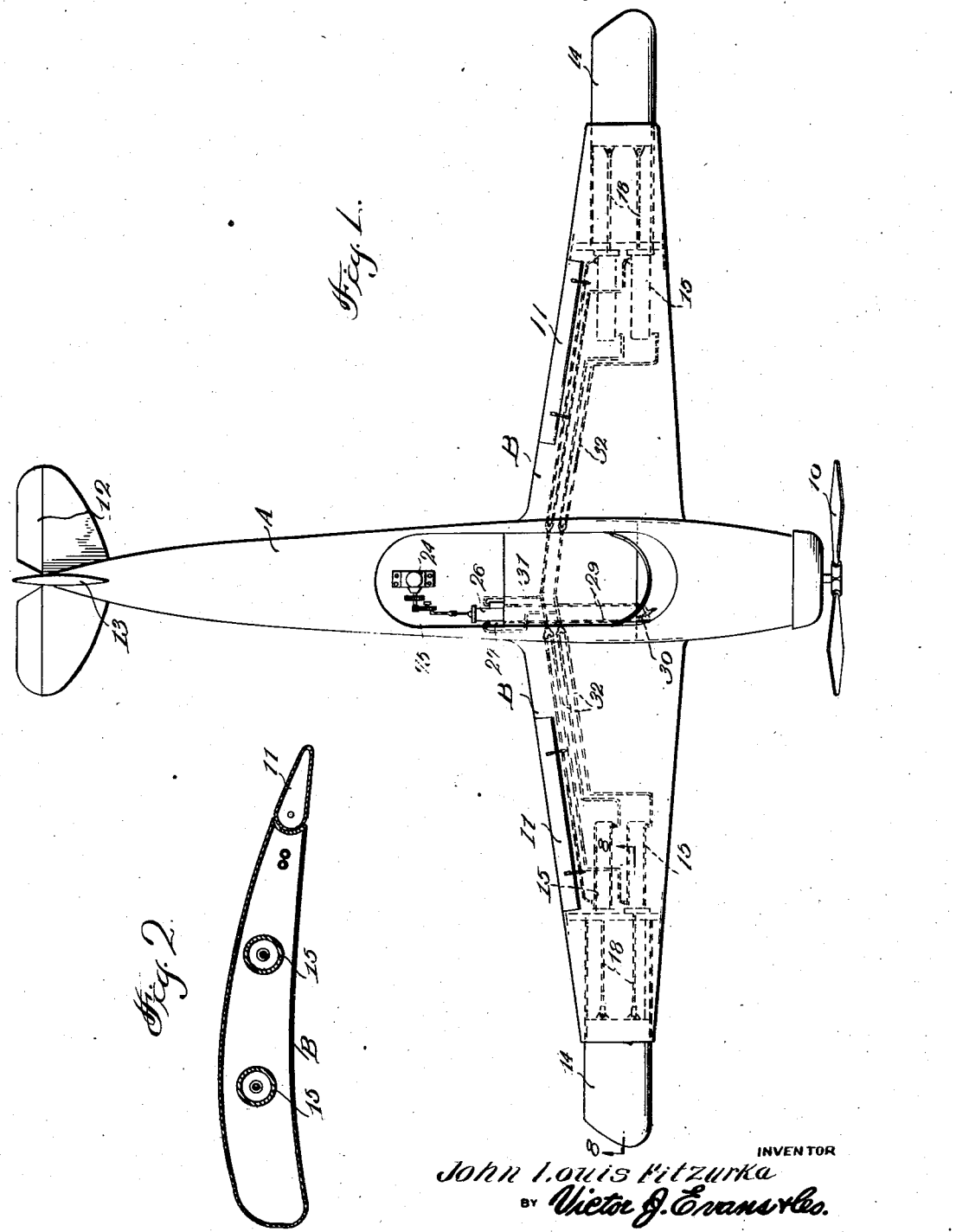
INVENTOR
John Louis Fitzurka
BY Victor J. Evans & Co.
ATTORNEYS July 22, 1941.   J. L. FITZURKA   2,249,729
AIRPLANE WING
Filed Sept. 18, 1939   3 Sheets-Sheet 2
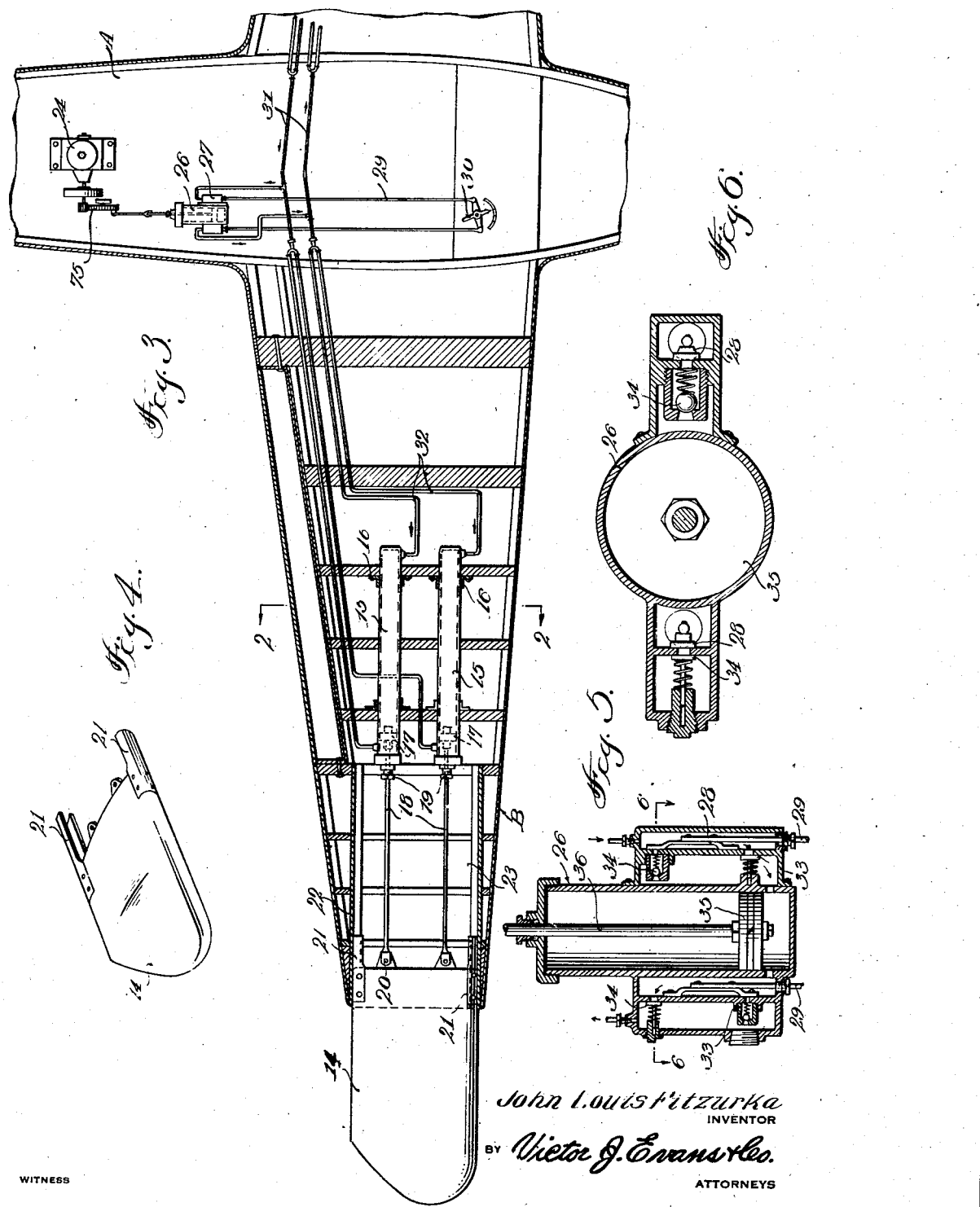

July 22, 1941.   J. L. FITZURKA   2,249,729
AIRPLANE WING
Filed Sept. 18, 1939   3 Sheets-Sheet 3

John Louis Fitzurka INVENTOR
BY Victor J. Evans & Co.
ATTORNEYS

UNITED STATES PATENT OFFICE 2,249,729

AIRPLANE WING

John Louis Fitzurka, Pittsburgh, Pa.

Application September 18, 1939, Serial No. 295,493

2 Claims. (Cl. 244—43)

The invention relates to airplane wings and more particularly to retractable airplane wings.

The primary object of the invention is the provision of a wing structure of this character wherein the wing surface can be varied for the purpose of increasing airplane speed when in flight, aiding the lifting power and enabling quick take-off or landing.

Another object of the invention is the provision of a wing structure of this character wherein the same is novel, being readily actuated, the main stationary wing or wings being augmented by adjustable tips thus increasing speed of an airplane when in flight in relation to the carrying load and assuring safety in landing.

A further object of the invention is the provision of a wing structure of this character wherein variance in the effective span of the airplane wing can be had with dispatch as conditions may require.

A still further object of the invention is the provision of a structure of this character, which is simple in its makeup, thoroughly reliable and efficient in operation, susceptible of positive control, convenient for manipulation, ready and easy of adjustment, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention and pointed out in the claims hereunto appended.

In the accompanying drawings:

Figure 1 is a top plan view of an airplane showing the structural setup of the invention in accordance therewith and associated with the said plane.

Figure 2 is a transverse sectional view through a stationary wing or sustaining member of the plane, being on an enlarged scale taken on the line 2—2 of Figure 4.

Figure 3 is a fragmentary horizontal sectional view through the airplane.

Figure 4 is a perspective view of one of the retractable tips.

Figure 5 is a horizontal sectional view taken through the pump.

Figure 6 is an enlarged sectional view taken on the line 6—6 of Figure 5 looking in the direction of the arrows.

Similar reference characters indicate corresponding parts throughout the several views in the drawings.

Figure 7:
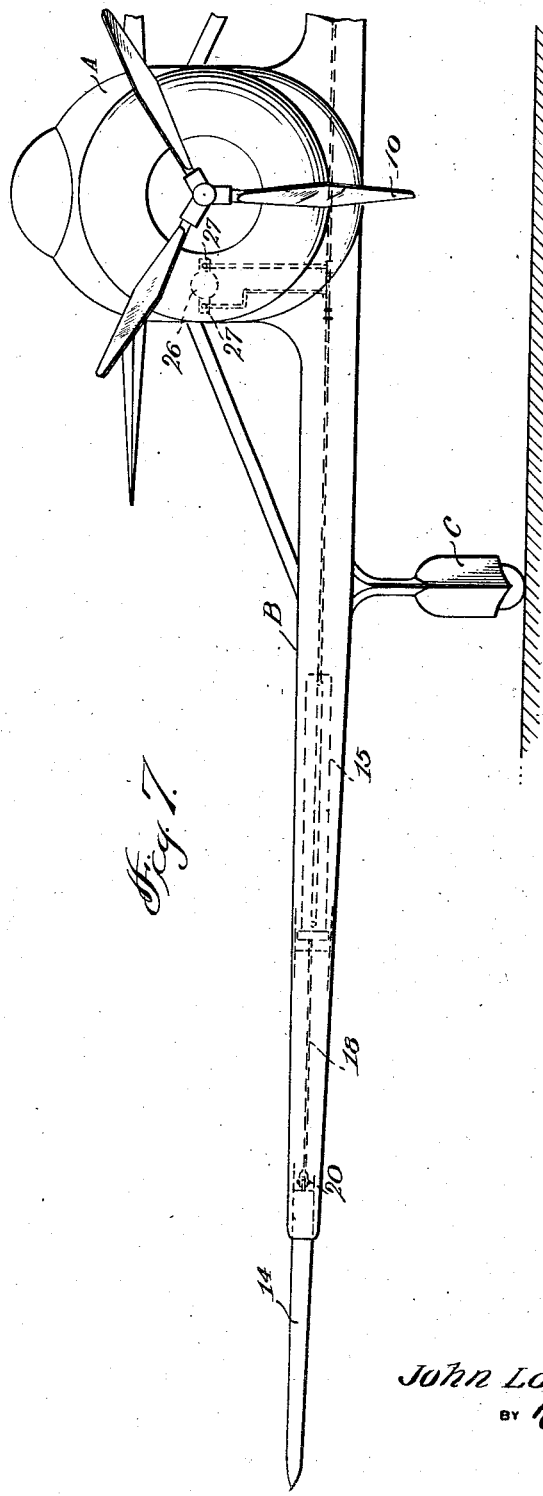
Figure 7 is a fragmentary front elevation of the plane.
Figure 8:
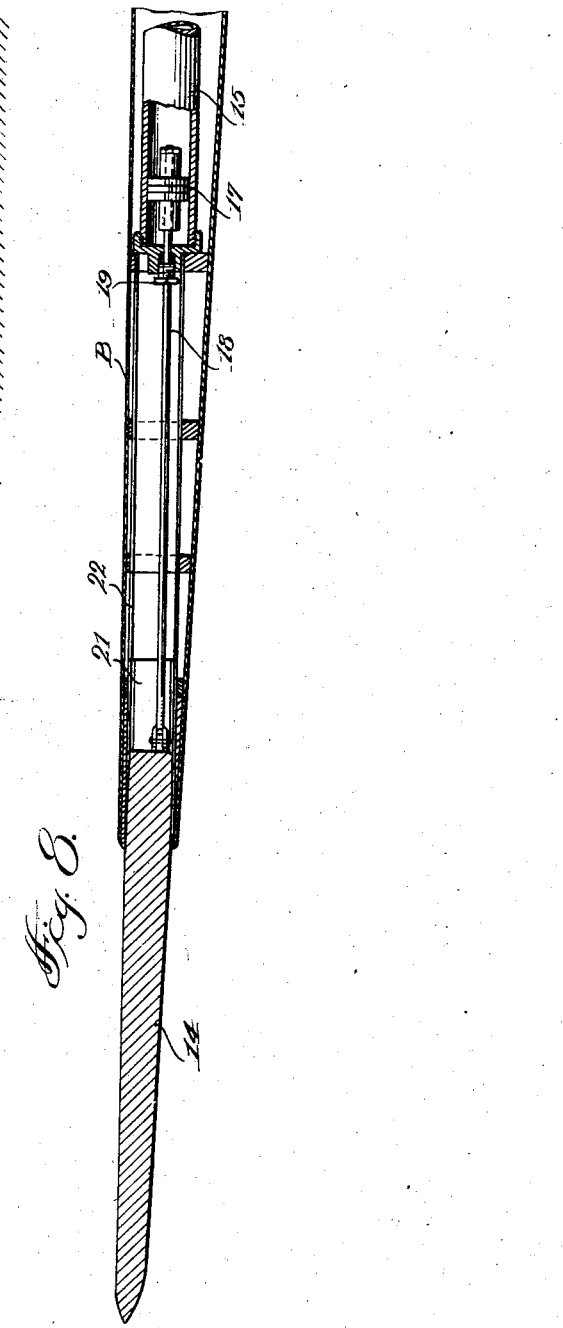
Figure 8 is an enlarged sectional view taken on the line 8—8 of Figure 1 looking in the direction of the arrows.

Referring to the drawings in detail, A designates generally the fuselage or body portion of an airplane, B the laterally projected stationary wings or flight sustaining members while C is the running or landing gear. The fuselage A is equipped with any standard propeller 10 at the nose or front end, and being also equipped with ailerons 11 elevated at 12 and rudder 13, respectively, these being of conventional type and operated or controlled in any desirable manner.

Each wing or member B slidably accommodates in the outermost end thereof an extensible and retractable tip 14 which increases or decreases the sustaining surface of the airplane in that it augments the said wing or member B. This tip 14 is controlled in its movements by dual or twin hydraulic reversing jacks including the pair of cylinders 15 arranged in spaced parallel relation within the wing or member B, being fixed therein at 16. Reciprocatingly movable in these cylinders 15 are pistons 17, their stems 18 being carried through packing glands 19 and are pivotally coupled at 20 to the inner ends of the said tips 14. Each tip 14 at the inner end thereof has fixed thereto runners 21, these operating in channeled tracks 22 stationarily built within the wing or member B at the way 23 provided for the travel of said tip.

Within the fuselage A is a motor or power source 24 which through gearing connections 25 operates a pump 26 of the double-acting type. This pump is built with valve chests 27 for slide valves 28 which through connecting rods 29 have connection with a control lever 30 so that said valves will be under manual control for regulating the direction of flow of fluid through conduits 31, each having branches 32 opening into the cylinders 15 at opposite sides of the piston 17 in each jack, and in this manner the travel of the pistons within the cylinders 15 is regulated for the extending or retracting of the tips 14 in unison with each other. In other words, the tips 14 are both extended and retracted synchronously and simultaneously with each other.

Each valve chest is fitted with fluid control valves 33 and 34, respectively, for regulatory flow of fluid from the pump 26 at opposite sides of the piston 35 therein, its stem 36 being included in the connections 25 with the motor or power source 24.

The piston 35 is reciprocated in the cylinder of the pump 26 through power transmitted from the source 24.

The construction hereinbefore delineated assures an increase in the wing area when an airplane is taking off from the ground, when climbing and when landing and conversely to decrease the wing area when traveling at high speeds. This variation in wing area enables increased speed in flight of the airplane in conformity to carrying load and assures safety to the plane while in flight and both in taking off or making landings.

What is claimed is:

1. In an aircraft, a fuselage having permanent wings extending laterally on opposite sides thereof, parallel channel-iron tracks within said wings adjacent the leading and trailing edges thereof, extensible and retractible tips within the outer ends of the wings and having their front and rear edges conforming with the channel-iron tracks in which they freely slide, runners carried by the rear and front edges of the tips and extending inwardly from the ends thereof and sliding within the channel-irons and forming unbroken continuations of the front and rear edges of the tips, and manually controlled operating means connected to the inner ends of the tips between the runners.

2. In an aircraft, a fuselage having tapered permanent wings extending laterally on opposite sides thereof, parallel channel-iron tracks within said wings adjacent the leading and trailing edges thereof, extensible and retractible tips within the outer ends of the wings and having parallel front and rear edges conforming with the channel-iron tracks in which they freely slide, runners carried by the rear and front edges of the tips and extending inwardly from the inner end thereof and sliding within the channel-irons and forming an unbroken continuation of the front and rear edges of the tips, and two manually controlled operating rods connected to the rear ends of the tips adjacent the runners.

JOHN LOUIS FITZURKA.